United States Patent [19]
Hashimoto

[11] Patent Number: 5,375,252
[45] Date of Patent: Dec. 20, 1994

[54] PAGING RADIO COMMUNICATIONS SYSTEM AND METHOD

[75] Inventor: Ken Hashimoto, Kawasaki, Japan

[73] Assignee: Fujitsu Limited, Kawasaki, Japan

[21] Appl. No.: 953,070

[22] Filed: Sep. 29, 1992

[30] Foreign Application Priority Data

Sep. 30, 1991 [JP] Japan .................. 3-278834

[51] Int. Cl.$^5$ .............................................. H04B 1/00
[52] U.S. Cl. ................... 455/51.2; 455/56.1; 455/57.1; 455/103; 340/825.44
[58] Field of Search .............. 455/38.1, 51.1, 51.2, 455/56.1, 57.1, 103; 340/825.44; 375/107

[56] References Cited

U.S. PATENT DOCUMENTS

| | | | |
|---|---|---|---|
| 4,255,814 | 3/1981 | Osborn | 455/51.2 |
| 4,696,051 | 9/1987 | Breeden | 455/51.2 |
| 5,077,759 | 12/1991 | Nakahara | 455/51.1 |
| 5,127,101 | 6/1992 | Rose, Jr. | 455/51.1 |

FOREIGN PATENT DOCUMENTS

8301878  5/1983  WIPO .................. 455/51.2

*Primary Examiner*—Reinhard J. Eisenzopf
*Assistant Examiner*—Andrew Faile
*Attorney, Agent, or Firm*—Staas & Halsey

[57] ABSTRACT

A paging radio communications system includes a plurality of radio receivers, a call controller for receiving a call message which requests a connection with at least one of the radio receivers and for generating a selective call signal having a predetermined format in which a preamble signal and a code word are provided, the code word including information specifying the at least one of the radio receivers, and a plurality of radio transmitters coupled to the call controller. Each of the radio transmitters includes a transmitter unit for transmitting a radio wave corresponding to the selective call signal without storing the selective call signal when one of predetermined transmission delay times has elapsed after receipt of the selective call signal, so that a part of the preamble signal and the code word are transferred to the radio receivers, and code words respectively transmitted by the transmitter unit of the radio transmitters are in phase with one another. The preamble signal contained in the selective call signal has a length equal to or longer than a sum of a maximum one of the transmission delay times and a predetermined minimum length of the preamble signal.

12 Claims, 9 Drawing Sheets

——— :RECEIVABLE AREA

- - - - :CARRIER SENSE OPERABLE AREA

FIG.4 PRIOR ART

——— :RECEIVABLE AREA

----- :CARRIER SENSE OPERABLE AREA

FIG.6

PAGING RADIO COMMUNICATIONS SYSTEM AND METHOD

BACKGROUND OF THE INVENTION

1. Field of the Invention

The present invention generally relates to a paging radio communication system and method, and more particularly to a private paging system in which a selective calling generated by a call controller is transmitted to a pager (a paging radio receiver or station) via radio transmitters.

2. Description of the Prior Art

In a paging radio communications system, such as a private paging system, a selective calling signal generated by a call controller is transmitted via radio transmitters. Normally, one radio transmitter covers a narrow service area. In this point of view, a plurality of radio transmitters spaced apart from each other are used so that a wide service area can be obtained. In order to prevent an area in which radio waves from the transmitters are not received at all, the radio transmitters are located so that boundary areas of adjacent service areas overlap each other. However, there is a possibility that radio waves having different phases may be received in the overlapping boundary areas. In this case, the radio waves interfere with each other, and cannot be correctly received by radio receivers (pagers). This decreases the receiving rate of the radio receivers.

In order to eliminate the above problem, the following method has been proposed. Each of the radio transmitters executes a carrier sensing operation before signal transmission, and determines whether or not at least one of the other transmitters is emitting a radio wave. When the above determination is affirmative, each of the radio transmitters delays the transmission timing in order to prevent two or more radio transmitters from concurrently emitting radio waves. The above method is described in the following document: "PAGING RADIO EQUIPMENT FOR SPECIFIED LOW POWER RADIO STATION, RCR STANDARD", Research & Development Center for Radio Systems, RCR STD-19, Jan. 25, 1990, the disclosure of which is hereby incorporated by reference.

Figure 1:
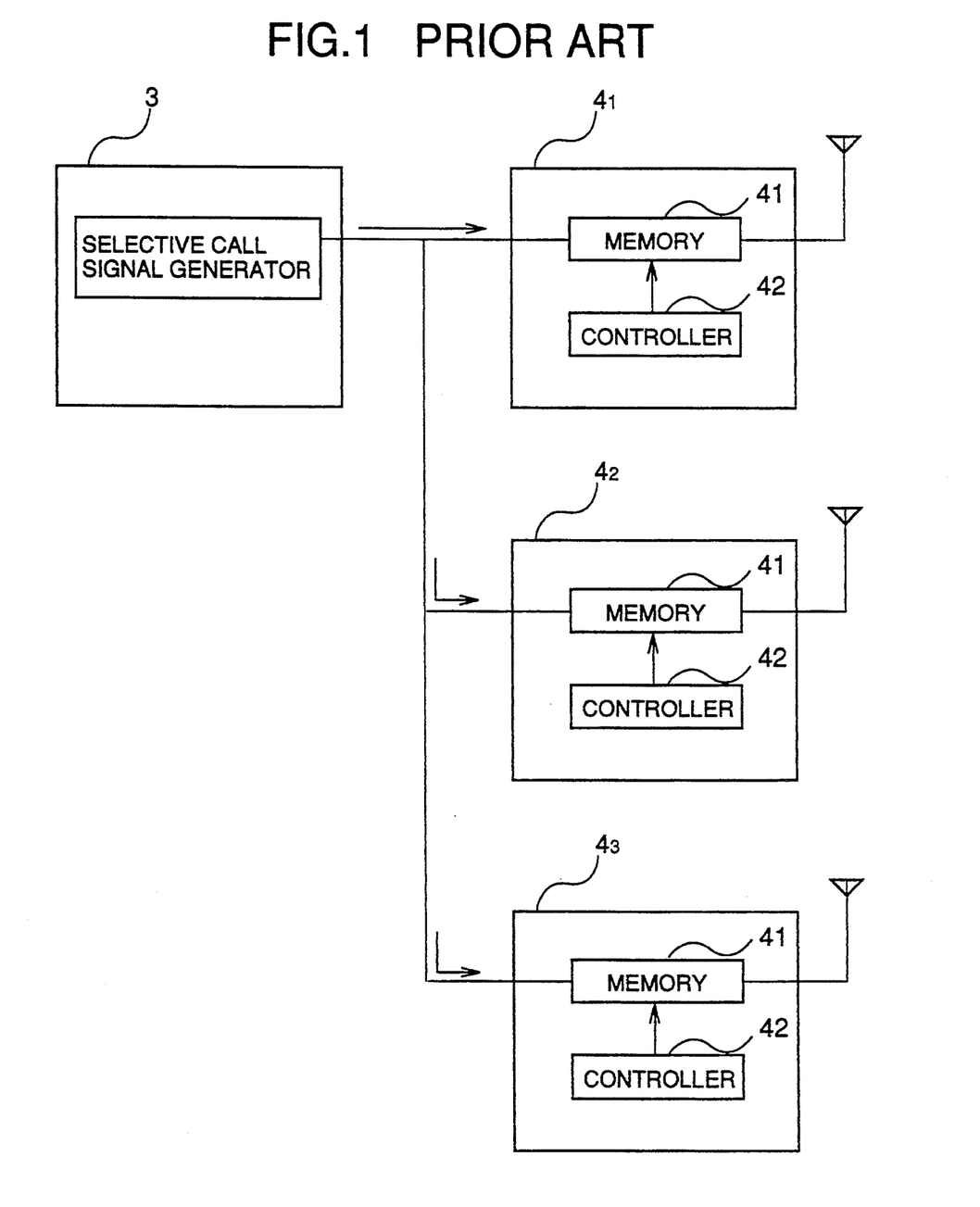
FIG. 1 is a block diagram of a conventional paging radio communications system.

FIG. 1 is a block diagram of a conventional paging radio communications system which conforms to the RCR STD-19 standard. The conventional paging radio communications system shown in FIG. 1 comprises a call controller 3, and radio transmitters $4_1$–$4_3$. The call controller 3 generates a selective calling signal (which is referred to as a POCSAG signal in the RCR STD-19 standard) in response to a request from an exchange, such as a private branch exchange (not shown). The selective calling signal has information indicating an identifier of a called station. The call controller 3 sends the selective calling signal to the radio transmitters $4_1$–$4_3$. Each of the radio transmitters $4_1$–$4_3$ comprises a memory 41, and a controller 42. The selective calling signal from the call controller 3 is temporarily stored in the memory 41 of each of the radio transmitters $4_1$–$4_3$ under the control of the respective controllers 42. Then, the identical selective calling signals are respectively read from the memories 41 of the radio transmitters $4_1$–$4_3$ at respective transmission timings in accordance with a procedure prescribed in the RCR STD-19 standard, and are then transmitted in the form of radio waves.

Figure 2:
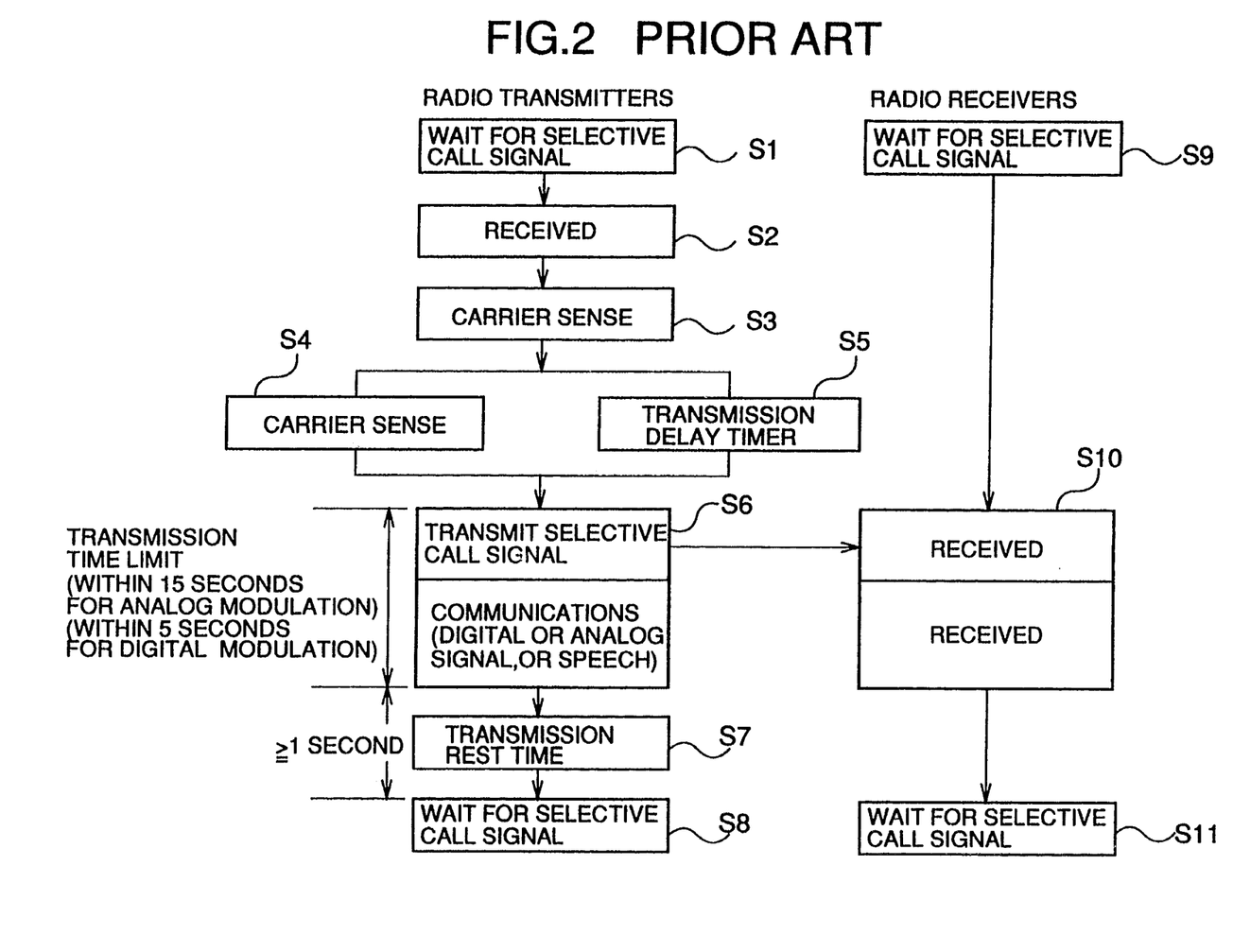
FIG. 2 is a flowchart of a transmission procedure according to the RCR STD-19 standard.

FIG. 2 is a flowchart of the procedure prescribed in the RCR STD-19 standard. The radio transmitters $4_1$–$4_3$ wait for receipt of the selective calling signal in step S1. The radio transmitters $4_1$–$4_3$ receive the selective calling signal, and start a calling process in step S2. In the calling process, the radio transmitters $4_1$–$4_3$ carry out a carrier sense operation in step S3 in order to determine whether or not there is a radio wave being emitted from one of the other radio transmitters and having a frequency identical to the frequency to be used (selected). In response to receipt of the selective calling signal from the call controller 3, the controller 42 of each of the radio transmitters $4_1$–$4_3$ selects one of eight predetermined transmission delay times and delays transmission of the selective calling signal in step S5. For example, the eight predetermined transmission delay times are equal to 600, 650, 700, 750, 800, 850, 900 and 950 ms. When the respective transmission delay times of the radio transmitters $4_1$–$4_3$ have elapsed, the respective controllers 42 determine, in step S4, whether or not radio waves from other radio transmitters are sensed. When the controllers 42 of the radio transmitters $4_1$–$4_3$ respectively determine that no radio waves are sensed, the radio transmitters $4_1$–$4_3$ transmit the identical selective calling signals corresponding to the selective calling signal and having frequencies identical to each other in step S6.

According to the RCR STD-19 standard, the selective calling signal may be in either analog or digital form, and a transmission rising time and a transmission falling time are respectively equal to or shorter than 0.02 seconds. Further, according to the standard, the allowable continuous transmission time is equal to or shorter than 15 seconds in analog form, and equal to or shorter than 5 seconds in digital form. However, the RCR STD-19 standard does not prescribe the format of the selective calling signal.

In the case where a radio wave from one of the other radio transmitters is sensed when the selected random transmission delay time has elapsed, one of the random transmission delay times is selected again. Transmission is delayed until the newly selected random transmission delay time elapses. When the newly selected random transmission delay time has elapsed, the carrier sense operation is executed again. In this manner, the above operation is repeatedly carried out until transmission of the selective calling signal becomes successful.

The radio receivers wait for receipt of the selective calling signal in step S9. When a radio receiver receives the selective calling signal addressed thereto, it transmits a response signal in step S10.

According to the RCR STD-19 standard, it is necessary to provide a transmission rest time equal to, for example, one second, after transmission of the selective calling signal (step S7). Then, the radio transmitters $4_1$–$4_3$ respectively wait for receipt of the selective calling signal from the call controller 3.

As described above, in order to transmit the selective calling signals from the radio transmitters $4_1$–$4_3$ in accordance with the RCR STD-19 standard, it is necessary to temporarily store the selective calling signal from the call controller 3 in the memories 41 of the radio transmitters $4_1$–$4_3$ and independently transmit the selective calling signals at respective transmission timings.

Figure 3:
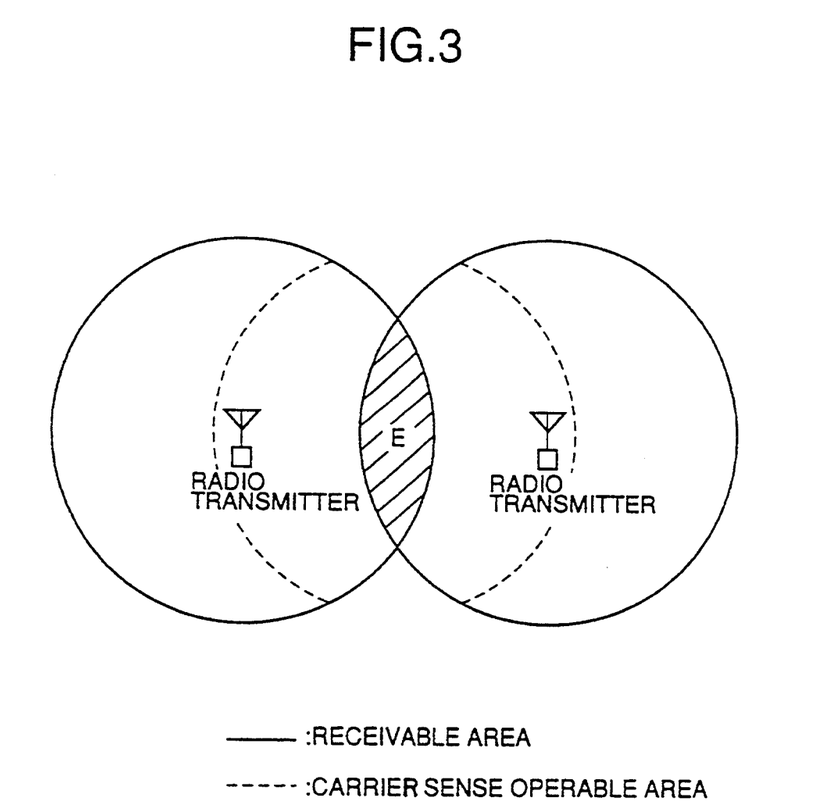
FIG. 3 is a diagram showing how adjacent radio transmitters are located.

Referring to FIG. 3, when each of two radio transmitters is capable of sensing a radio wave emitted from the other radio transmitter, the carrier sense operation is correctly carried out, and prevents the radio transmitters from concurrently transmitting radio waves respectively having identical frequencies according to the RCR STD-19 standard. Hence, a radio receiver located in an overlapping area E does not concurrently receive the radio waves from the radio transmitters. Hence, a decrease in the receiving rate does not occur.

Figure 4:
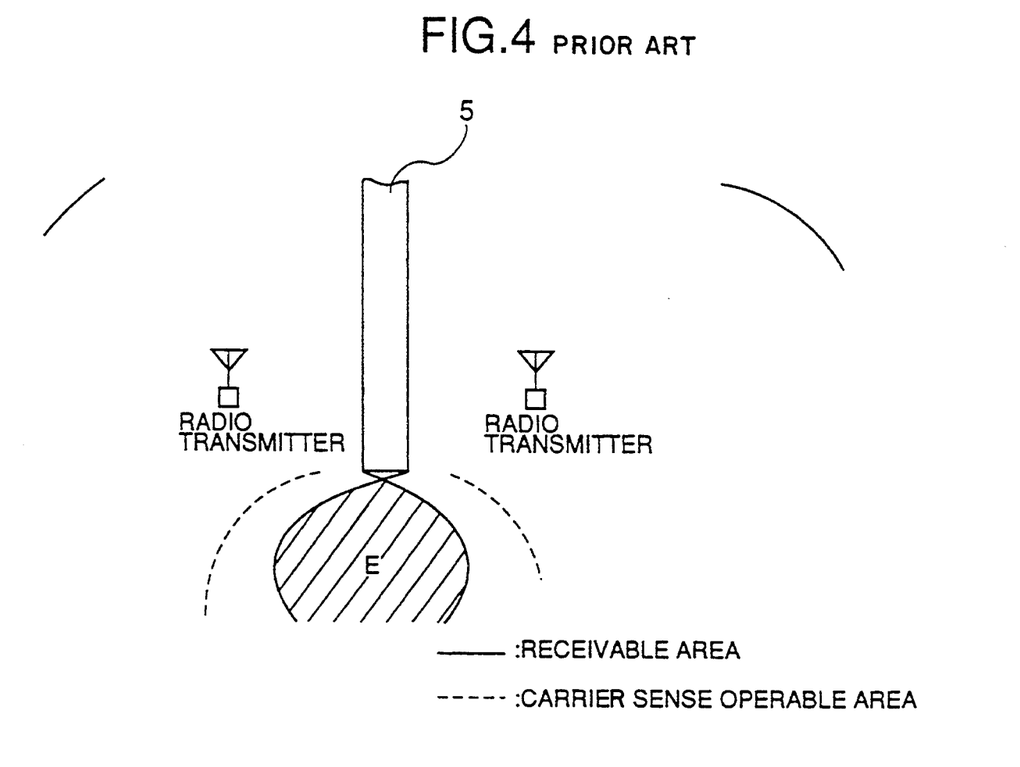
FIG. 4 is a diagram showing a problem of the conventional paging radio communications system.

FIG. 4 shows a case where each of the radio transmitters cannot sense a radio wave emitted from the other radio transmitter because of a barrier 5, such as a building, while the overlapping area E is obtained. In this case, each of the radio transmitters does not sense the radio wave from the other radio transmitter, and hence transmit the selective calling signals independently of each other according to the RCR STD-19 standard. The radio transmitters send the selective calling signals at the respective transmission timings, and hence the selective calling signals are not in phase with each other. The selective calling signals interfere with each other, and a radio receiver in the overlapping area E fails to receive the selective calling signal.

SUMMARY OF THE INVENTION

It is a general object of the present invention to provide a paging radio communications system and method in which the above disadvantages are eliminated.

A more specific object of the present invention is to provide a paging radio communications system and method in which a radio receiver is capable of responding to selective calling signals concurrently emitted from a plurality of radio transmitters.

The above objects of the present invention are achieved by a paging radio communications system comprising: a plurality of radio receivers; call controller means for receiving a call message which requests a connection with at least one of the radio receivers and for generating a selective call signal having a predetermined format in which a preamble signal and a code word are provided, the code word including information specifying the at least one of the radio receivers; and a plurality of radio transmitters coupled to the call controller means. Each of the radio transmitters comprises transmitter means for transmitting a radio wave corresponding to the selective call signal without storing the selective call signal when one of predetermined transmission delay times has elapsed after receipt of the selective call signal, so that a part of the preamble signal and the code word are transferred to the radio receivers, and code words respectively transmitted by the transmitter means of the radio transmitters are in phase with one another. The preamble signal contained in the selective call signal has a length equal to or longer than a sum of a maximum one of the transmission delay times and a predetermined minimum length of the preamble signal.

The above objects of the present invention are also achieved by a paging radio communications method for a paging radio communications system in which a call controller, a plurality of radio transmitters connected to the call controller, and a plurality of radio receivers are provided, the paging radio communications method comprising the steps of: (a) receiving, in the call controller, a call message which requests a connection with at least one of the radio receivers; (b) generating, in the call controller, a selective call signal having a predetermined format in which a preamble signal and a code word are provided, the code word including information specifying the at least one of the radio receivers; and (c) transmitting, from each of the radio transmitters, a radio wave corresponding to the selective call signal without storing the selective call signal when one of predetermined transmission delay times has elapsed after receipt of the selective call signal, so that a part of the preamble signal and the code word are transferred to the radio receivers, and codes words respectively transmitted by the radio transmitters are in phase with one another. The preamble signal is configured as described above.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

Figure 5:
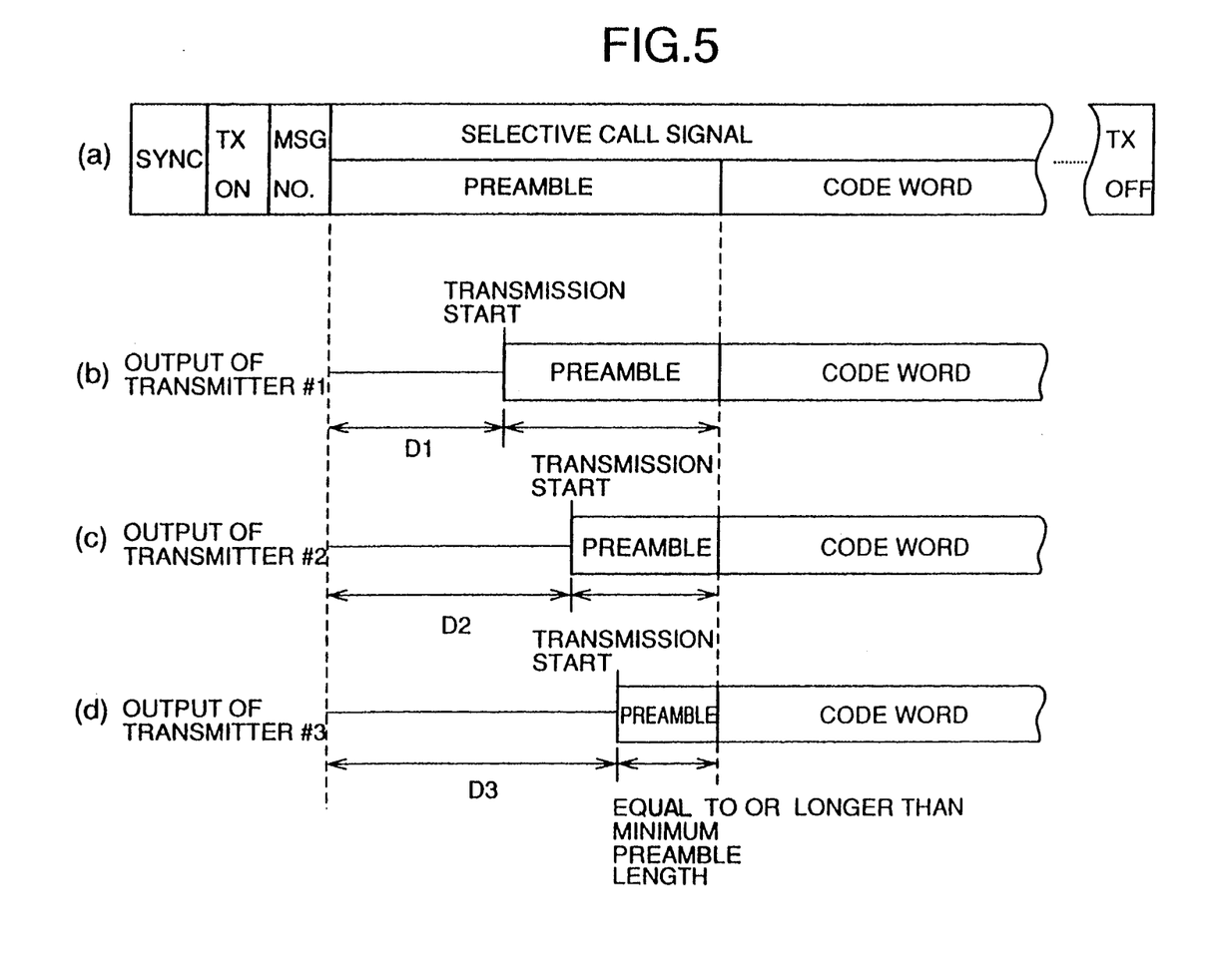
FIG. 5 is a timing chart showing an overview of the present invention.

FIG. 5 is a diagram showing an overview of the present invention. FIG. 5-(a) shows data output by a call controller, and FIG. 5-(b), (c) and (d) show selective calling signals respectively transmitted from radio transmitters #1, #2 and #3 connected to the call controller.

The selective calling signal shown in FIG. 5-(a) includes a synchronizing signal SYNC, a transmitter ON signal TX ON, a message number MSG NO, the aforementioned selective calling signal, and a transmitter OFF signal TX OFF. The synchronizing signal SYNC synchronizes the radio transmitters #1-#3 with one another. The transmitter ON signal TX ON turns ON the radio transmitters #1-#3. The message number MSG NO indicates the number of a message subsequent thereto. The selective calling signal includes a preamble signal, and a code word. According to the aforementioned RCR STD-19 standard, the preamble signal must have a preamble length equal to or greater than a minimum preamble length. The code word contains synchronizing information concerning the selective call signal, and information specifying a called radio receiver.

According to the RCR STD-19 standard, each of the radio transmitters #1-#3 must transmit the selective calling signal after a delay selected from one of the predetermined transmission delay times. As has been described previously, the predetermined transmission delay times are equal to 600, 650, 700, 750, 800, 850, 900 and 950 ms.

The preamble length of the preamble signal of the selective calling signal generated by the call processor 5 is determined so that it is equal to or longer than the sum of the minimum preamble length and the longest transmission delay time. In the case shown in FIG. 5, the minimum preamble length is equal to 576 bits, and the longest transmission delay time is equal to 950 ms. Hence, the preamble length of the preamble signal of the selective calling signal is selected so that it is equal to or longer than the sum of a time corresponding to 576 bits and 950 ms.

The radio transmitters #1-#3 start to transmit the preamble signals after the respective random transmission delay times have elapsed. More particularly, the radio transmitter #1 starts to transmit the preamble signal after a delay time D1 from the beginning of the selective calling signal received from the call processor. The radio transmitter #2 starts to transmit the preamble signal after a delay time D2 from the beginning of the selective call signal. The radio transmitter #3 starts to transmit the preamble signal after a delay time D3 from the beginning of the selective call signal. If the delay time D3 corresponds to the longest delay time equal to 950 ms, the preamble signal transmitted by the radio transmitter #3 has a length equal to or longer than the minimum preamble length.

In this manner, the beginning points of the code words transmitted from the radio transmitters #1-#3 are synchronized with one another. It should be noted that the selective calling signal from the call controller is not stored in each of the radio transmitters #1-#3, and is transmitted via the radio transmitters #1-#3 without delay time. A radio receiver receives the identical selective calling signals in phase with each other from two or more radio transmitters. Hence, the radio receiver can correctly receive the selective calling signals.

Figure 6:
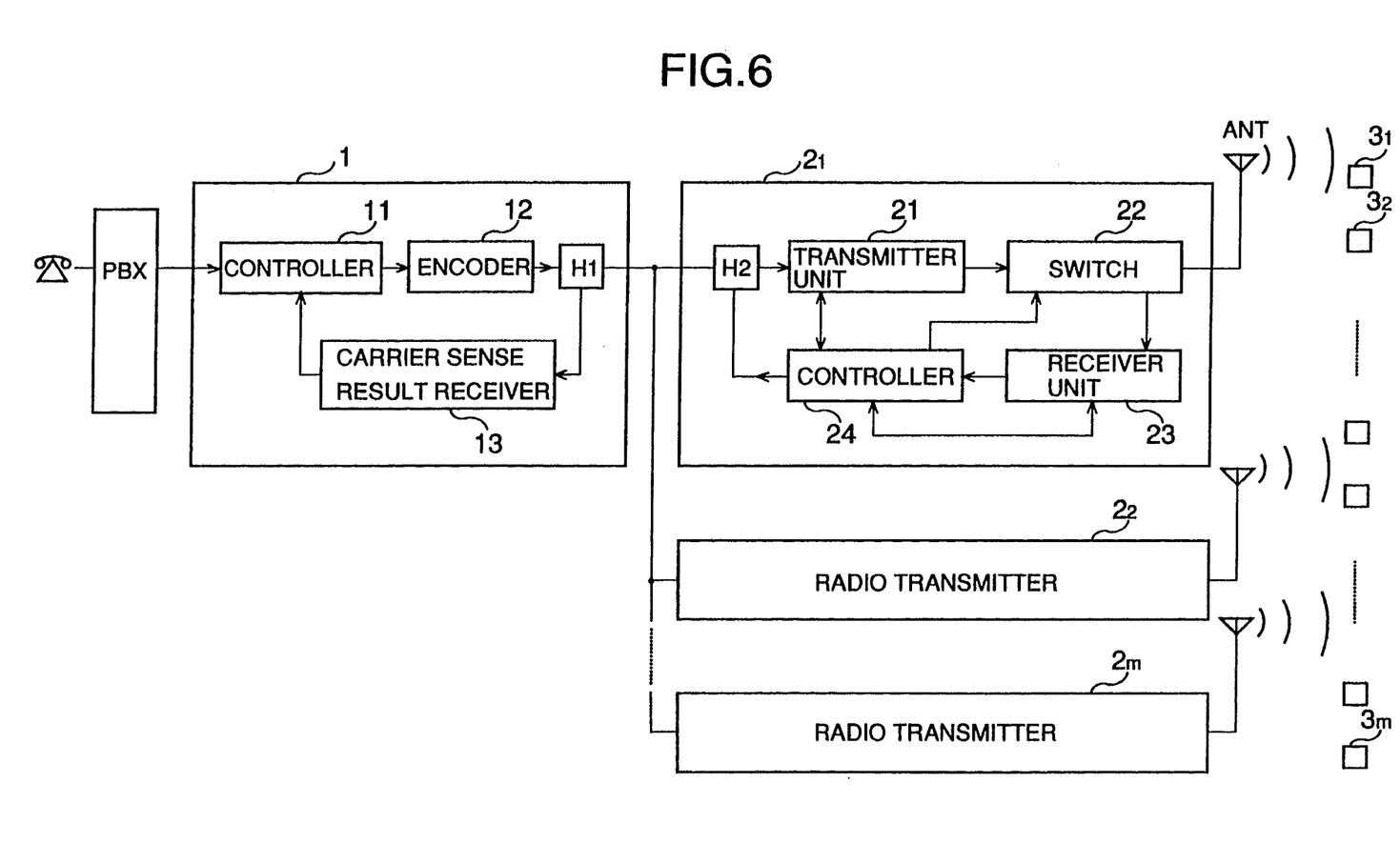
FIG. 6 is a block diagram of a paging radio communications system according to an embodiment of the present invention.

FIG. 6 is a block diagram of a paging radio communications system according to an embodiment of the present invention. The paging radio communications system comprises a call controller 1, a plurality of radio transmitters $2_1$-$2_m$ where m is an integer, and a plurality of radio receivers $3_1$-$3_n$ where n is an integer. The call controller 1 is coupled to a private branch exchange PBX, to which a plurality of terminals, such as telephone sets and computer terminals, are connected. The controller 11 can directly receive a call message, such as an emergency signal, without the PBX.

The call controller 1 comprises a controller 11, an encoder 12, a carrier sense result receiving unit 13, and a hybrid circuit H1. The radio transmitter $2_1$ comprises a transmitter unit 21, a switch 22, a receiver unit 23, a controller 24, and a hybrid circuit H2. Each of the other radio transmitters $2_2$-$2_m$ is configured in the same manner as the radio transmitter $2_1$. It should be noted that the radio transmitters $2_1$-$2_m$ do not have memories for storing the selective call signal from the call controller 1. Each of the radio receivers $3_1$-$3_n$ has a conventional configuration. For example, each of the radio receivers $3_1$-$3_n$ comprises a receiver unit, an indicator, a display device formed with a liquid crystal display, and a memory for storing a message received. The display device is capable of displaying a predetermined number of characters. The indicator comprises an LED and/or a sounder.

The PBX receives a call request from a terminal, and sends a call message requesting a connection with a called radio receiver to the call controller 1. The controller 11 receives the above call message, and transfers it to the encoder 12. The encoder 12 generates the selective call signal (POCSAG signal prescribed in the RCR STD-19 standard) from the received call message. The selective call signal passes through the hybrid circuit H1, and is supplied to the radio transmitter $2_1$-$2_m$. The carrier sense result receiving unit 13 receives carrier sense result signals from the radio transmitters $2_1$-$2_m$ via the hybrid circuit H1, and sends these signals to the controller 11. The controller 11 determines, on the basis of the carrier sense result signals, whether or not the selective call signal which has the same content as the previous one should be retransmitted.

The transmitter unit 21 of the radio transmitter $2_1$ receives the selective call signal via the hybrid circuit H2, and generates a corresponding radio wave. The transmitter unit 21 comprises a plurality of channels having different frequencies. The radio wave emitted from the transmitter unit 21 has been modulated by an analog or digital modulation process. The channels have frequencies close to, for example, 430 MHz. The transmission power of the radio wave is equal to, for example, 10 mW. The radio wave generated by the transmitter unit 21 is emitted via the switch 22 and an antenna ANT. The switch 22 also has the function of applying a radio wave received via the antenna ANT to the receiver unit 23. Of course, it is possible for the transmitter unit 21 to have a single channel.

The receiver unit 23 converts the received radio wave into a carrier sense signal, which is applied to the controller 24. The transmitter unit 21 and the receiver unit 23 have a synthesizer (not shown) in common thereto as in the case of a conventional radio transmitter, and select the same channel as each other. The controller 24 determines whether or not the carrier having the same frequency as that emitted by the transmitter unit 21 of the radio transmitter $2_1$ is being emitted from one of the other transmitter units $2_2$-$2_m$. A carrier sensor result signal indicating the result of the above determination is output to the call controller 1 via the hybrid circuit H2. The controller 24 is provided with a CPU, and controls the entire operation of the radio transmitter $2_1$ in addition to the above-mentioned operations.

It should be noted that the carrier sense operation is not needed according to the transmission process shown in FIG. 5. However, since the carrier sense operation is needed by the RCR STD-19 standard, it is preferable that the radio transmitters $2_1$-$2_m$ respectively have the carrier sensing functions. Further, there is a possibility that a radio wave emitted from another communications system may be received. In this case, the radio receivers will fail to receive the selective call signals transmitted by the radio transmitters $2_1$-$2_m$.

Figure 7:
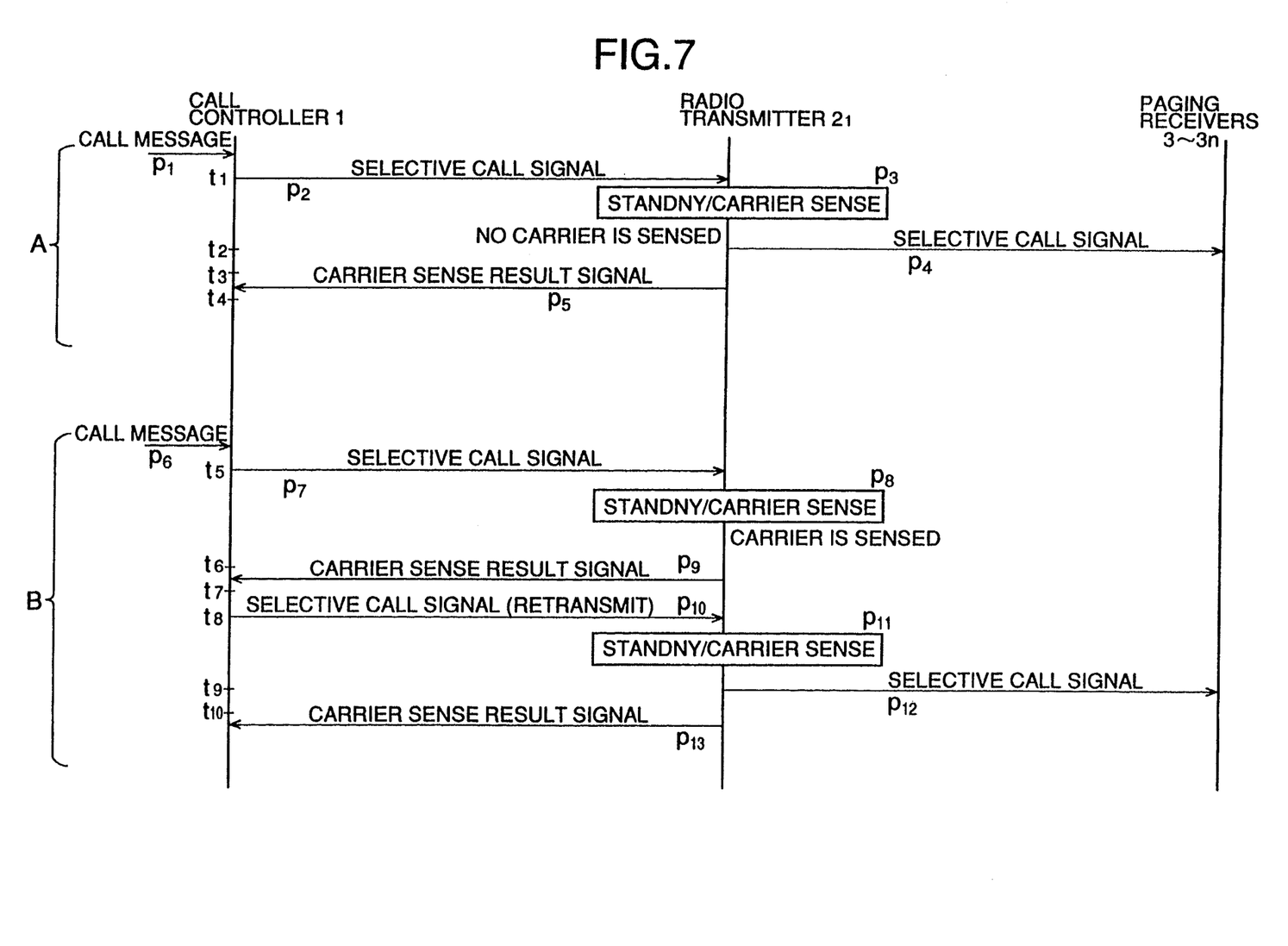
FIG. 7 is a sequence diagram showing the operation of the paging radio communications system shown in FIG. 6.

A description will now be given, with reference to FIG. 7, of the operation of the paging radio communications system shown in FIG. 6. The controller 11 of the call controller 1 receives, from the PBX, a call message which requests a connection with a called radio receiver (P1 shown in FIG. 7). The controller 11 sends the received call message to the encoder 12, which generates the selective call signal as shown in FIG. 5-(a). Then, the encoder 12 successively sends the radio transmitters $2_1$-$2_m$ the synchronizing signal SYNC, the transmitter ON signal, the message number signal, the selective call signal, and the transmitter OFF signal in this sequence (P2). For convenience and simplicity, FIG. 7 shows only the radio transmitter $2_1$. According to the RCR STD-19 standard, the minimum length of the preamble signal is equal to 576 bits, and the longest random transmission delay time is 950 ms. According to the embodiment of the present invention, the preamble signal of the selective call signal has a length equal to or longer than the sum of a time corresponding to 576 bits and 950 ms.

Figure 8:
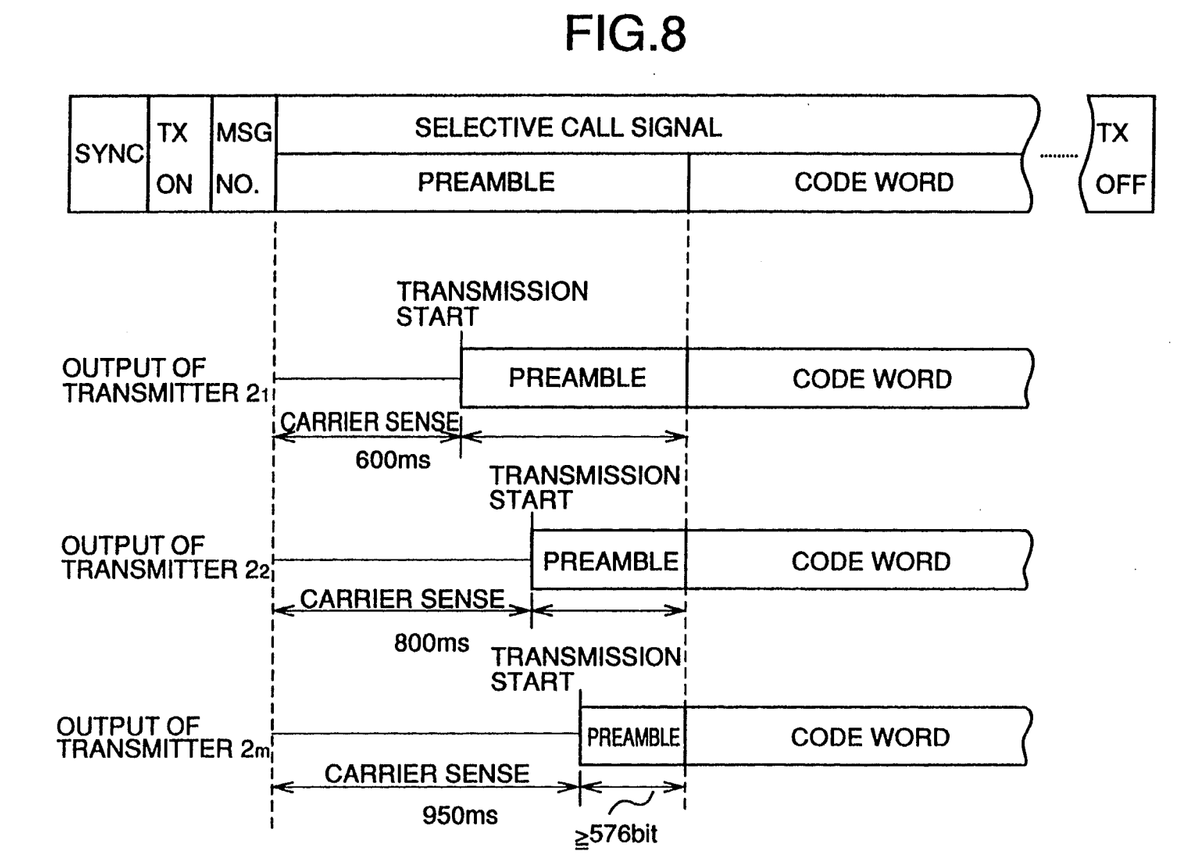
FIG. 8 is a timing chart showing the operation of the paging radio communications system shown in FIG. 6.

The radio transmitters $2_1$-$2_m$ concurrently receive the above-mentioned consecutive signals. The controller 24 of each of the radio transmitters $2_1$-$2_m$ starts the carrier sense operation in synchronism with the beginning of the preamble signal of the selective call signal (P3). At the same time, the controller 24 selects one of the random transmission delay times and delays transmission of the selective call signal by the selected random transmission delay time (P3). In a case shown in FIG. 8, the radio transmitter $2_1$, $2_2$ and $2_m$ respectively select random transmission delay times of 600 ms, 800 ms, and 950 ms. When the radio transmitter $2_1$ does not sense a carrier having the same frequency as a frequency set in the transmitter unit 21 during the standby time equal to 600 ms in the case shown in FIG. 8, the transmitter unit 21 starts to transmit the selective call signal received from the call controller 1 at time $t_2$ shown in FIG. 7 (P4). According to the RCR STD-19 standard, the allowable continuous transmission time during which signal transmission is allowed is 5 seconds when the transmission signal is a digital signal. In FIG. 7, the period between times $t_1$ and $t_2$ corresponds to the selected random transmission delay time for the radio transmitter $2_1$, and the period between times $t_2$ and $t_3$ corresponds to the allowable continuous transmission time.

It should be noted that the selective call signal is transmitted to the radio receivers while a beginning part of the preamble signal is discarded. However, there is no problem because the preamble signal transmitted to the radio receivers is ensured to have a length equal to or longer than the minimum preamble length.

In the above-mentioned manner, the code words received from the call controller 1 are simultaneously transmitted to the radio receivers $3_1$-$3_n$. That is, the selective call signals transmitted by the radio transmitters $2_1$-$2_m$ are in phase with one another. Hence, if a radio receiver receives two or more selective call signals, it can correctly receive them as if a single selective call signal is received.

Figure 9:
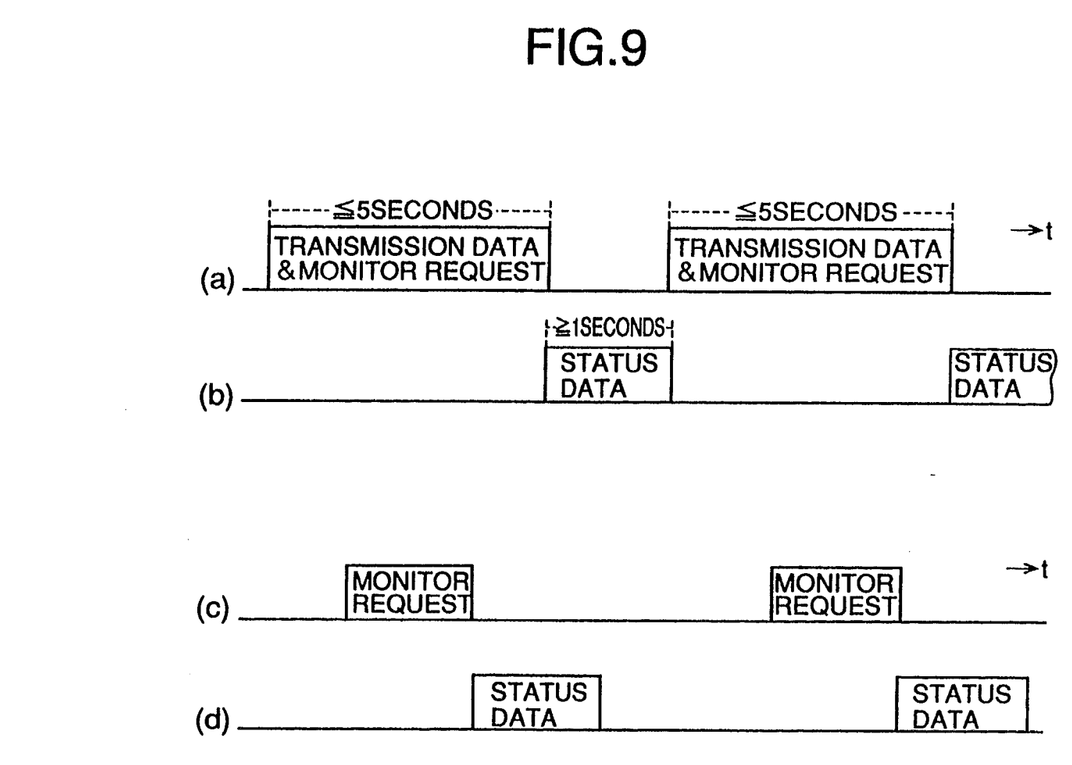
FIG. 9 is a timing chart showing how a carrier sense result signal is transferred from a radio transmitter and a call controller.

After the allowable continuous transmission time has elapsed, the controller 24 of each of the radio transmitters $2_1$-$2_m$ sends the carrier sense result signal to the call controller 1 (P5). As shown in FIG. 9-(a), a monitor request signal is added to transmission data transmitted by the call controller 1. According to the RCR STD-19 standard, it is necessary to provide a transmission rest time equal to or longer than one second. The period between times $t_3$ and $t_4$ corresponds to the transmission rest time. During the transmission rest time, the carrier sense result signal is sent to the call controller 1, as shown in FIG. 9-(b). In a case where there is no transmission data, the monitor request signal is periodically sent to the radio transmitters $2_1$-$2_m$. In response to receipt of the monitor request signal, each of the radio transmitters $2_1$-$2_m$ sends the carrier sense result signal to the call controller 1.

FIG. 7-B shows a case where the radio transmitter $2_1$ senses a carrier having the same frequency as the carrier used in the transmitter unit 21. Sequences P6–P8 are carried out in the same manner as the sequences P1–P3. When a carrier is sensed, the radio transmitter $2_1$ sends, during the time between $t_6$ and $t_7$ corresponding to the transmission rest time, the carrier sense result signal to the call controller, indicating that the radio transmitter $2_1$ has failed to transmit the selective call signal (P9). In this case, the controller 24 disables the transmitter unit 21 to transmit the selective call signal. As has been pointed out, there is a possibility that the radio transmitters may receive a signal used in another communications system.

The carrier sense result receiver 13 receives the carrier sense result signals from the radio transmitters $2_1$-$2_m$. In this case, the carrier sense result signal from the radio transmitter $2_1$ indicates that it has failed to transmit the selective call signal in the previous cycle. The controller 11 is informed of the above result, and retransmits to the radio transmitters $2_1$-$2_m$ the selective call signal which is the same as that transmitted in sequence P7. The controller 24 of each of the radio transmitters $2_1$-$2_m$ determines whether or not the message number just received has been previously received. The controller 24 has a built-in memory which functions as a work area of the CPU, and the message numbers received are stored therein when the transmission signals having the message numbers are successful. When it is determined that the message number just received has been previously received, the received selective call signal is discarded. In the case B shown in FIG. 7, the controller 24 of the radio transmitter $2_1$ determines that the message number just received has not been previously received. If there is no carrier sensed, the received selective call signal is transmitted from the radio transmitter $2_1$ to the radio receivers after a newly selected random transmission delay time has elapsed (P11, P12). Then, the carrier sense result signal is sent to the call controller 1 (P13).

The above operation is repeatedly carried out until all the radio transmitters $2_1$-$2_m$ complete transmission of the identical selective call signals.

The present invention is not limited to the paging radio communications systems which use the selective call signal having the format shown in FIG. 5-(a). For example, in some cases, radio wave management information is provided immediately before the preamble signal. According to the RCR STD-19 standard, the radio wave management information contains a bit synchronizing signal, a frame synchronizing signal and a call signal including a call name and an error correction signal. In this case, the preamble signal of the selective call signal is set to be a length equal to or longer than the sum of the longest random transmission delay time, the length of the radio wave management information, and the minimum preamble length.

The present invention is not limited to the specifically disclosed embodiments, and variations and modifications may be made without departing from the scope of the present invention.

What is claimed is:

1. A paging radio communications system comprising:
   a plurality of radio receivers;
   call controller means for receiving a call message which requests a connection with at least one of the radio receivers and for generating a selective call signal having a predetermined format in which a preamble signal and a code word are provided, said code word including information specifying said at least one of the radio receivers; and a plurality of radio transmitters coupled to said call controller means, each of said radio transmitters comprising transmitter means for transmitting a radio wave corresponding to said selective call signal without storing said selective call signal when one of predetermined transmission delay times has elapsed after receipt of said selective call signal, so that a part of the preamble signal and the code word are transferred to the radio receivers, and the code words respectively transmitted by the transmitter means of the radio transmitters are in phase with one another, the preamble signal contained in the selective call signal having a length equal to or longer than a sum of a maximum one of the transmission delay times and a predetermined minimum length of the preamble signal.

2. A paging radio communications system as claimed in claim 1, wherein each of said radio transmitters comprises:

carrier sense means for sensing a carrier signal having a frequency identical to that of said radio wave transmitted by said transmitter means; and control means, coupled to said transmitter means and said carrier sense means, for disabling said transmitter means to transmit the radio wave when said carrier sense means senses the carrier signal.

3. A paging radio communications system as claimed in claim 2, wherein said call controller means comprises retransmission means for monitoring said carrier sense means of the radio transmitters and for retransmitting said selective call signal to the radio transmitters when one of the radio transmitters senses the carrier signal.

4. A paging radio communications system as claimed in claim 3, wherein said control means of each of said radio transmitters comprises means for making the transmitter means retransmit the radio wave corresponding to the selective carrier signal when the carrier sense means of said one of the radio transmitters senses the carrier signal and the transmitter means is disabled in a previous transmission cycle.

5. A paging radio communications system as claimed in claim 1, wherein each of said radio transmitters comprises means for selecting one of the predetermined transmission delay times at random.

6. A paging radio communications system as claimed in claim 1, further comprising an exchange to which a plurality of terminals is connected, said call message being generated by one of the plurality of terminals.

7. A paging radio communications method for paging radio communications system in which a call controller, a plurality of radio transmitters connected to said call controller, and a plurality of radio receivers are provided, said paging radio communications method comprising the steps of:

(a) receiving, in the call controller, a call message which requests a connection with at least one of the radio receivers;

(b) generating, in the call controller, a selective call signal having a predetermined format in which a preamble signal and a code word are provided, said code word including information specifying said at least one of the plurality of radio receivers; and (c) transmitting, from each of the radio transmitters, a radio wave corresponding to said selective call signal without storing said selective call signal when one of predetermined transmission delay times has elapsed after receipt of said selective call signal, so that a part of the preamble signal and the code word are transferred to the plurality of radio receivers, and the code words respectively transmitted by the plurality of radio transmitters are in phase with one another, the preamble signal contained in the selective call signal having a length equal to or longer than a sum of a maximum one of the transmission delay times and a predetermined minimum length of the preamble signal.

8. A paging radio communications method as claimed in claim 7, further comprising the steps of:

(d) sensing, at each of the radio transmitters, a carrier signal having a frequency identical to that of said radio wave transmitted by the radio transmitters; and (f) disabling the radio transmitters to transmit the radio wave when the carrier signal is sensed in said radio transmitters.

9. A paging radio communications method as claimed in claim 8, further comprising the steps of:

(g) monitoring whether or not the carrier signal is sensed in each of the radio transmitters; and (h) retransmitting said selective call signal to all the radio transmitters when the carrier signal is sensed in one of the radio transmitters.

10. A paging radio communications method as claimed in claim 9, further comprising the step (i) of making said one of the radio transmitters retransmit the radio wave corresponding to the selective carrier signal in response to receipt of said selective call signal retransmitted in said step (h).

11. A paging radio communications method as claimed in claim 7, further comprising the step (d) of selecting one of the predetermined transmission delay times at random.

12. A paging radio communications method as claimed in claim 7, wherein said step (a) comprises the step of receiving the call message from an exchange to which a plurality of terminals is connected, said call message being generated by one of the plurality of terminals.

* * * * *